US008806480B2

(12) United States Patent
Araujo, Jr. et al.

(10) Patent No.: US 8,806,480 B2
(45) Date of Patent: Aug. 12, 2014

(54) VIRTUAL MACHINE SMART MIGRATION

(75) Inventors: Nelson Sampaio Araujo, Jr., Redmond, WA (US); Robert M. Fries, Kirkland, WA (US); Michael L. Michael, Houston, TX (US)

(73) Assignee: Microsoft Corporation, Redmond, WA (US)

( * ) Notice: Subject to any disclaimer, the term of this patent is extended or adjusted under 35 U.S.C. 154(b) by 1877 days.

(21) Appl. No.: 11/772,056

(22) Filed: Jun. 29, 2007

(65) Prior Publication Data

US 2009/0007106 A1     Jan. 1, 2009

(51) Int. Cl.
*G06F 9/455*     (2006.01)

(52) U.S. Cl.
USPC .......................................................... 718/1

(58) Field of Classification Search
None
See application file for complete search history.

(56) References Cited

U.S. PATENT DOCUMENTS

| | | | |
|---|---|---|---|
| 6,263,359 B1 * | 7/2001 | Fong et al. | 718/103 |
| 6,698,017 B1 | 2/2004 | Adamovits et al. | 717/168 |
| 6,941,410 B1 | 9/2005 | Traversat et al. | 711/6 |
| 6,981,005 B1 * | 12/2005 | Cabrera et al. | 1/1 |
| 7,072,919 B2 | 7/2006 | Sexton et al. | 707/206 |
| 7,165,158 B1 | 1/2007 | Yagawa | 711/165 |
| 7,680,919 B2 * | 3/2010 | Nelson | 709/223 |
| 7,761,573 B2 * | 7/2010 | Travostino et al. | 709/226 |
| 2004/0010787 A1 * | 1/2004 | Traut et al. | 718/1 |
| 2005/0268298 A1 | 12/2005 | Hunt et al. | 718/1 |
| 2006/0005189 A1 | 1/2006 | Vega et al. | 718/1 |
| 2006/0069761 A1 | 3/2006 | Singh et al. | 709/222 |
| 2006/0195715 A1 | 8/2006 | Herington | 714/4 |
| 2006/0225065 A1 | 10/2006 | Chandhok et al. | 717/168 |
| 2006/0230407 A1 | 10/2006 | Rosu et al. | 718/105 |

OTHER PUBLICATIONS

Clark, C. et al., "Live Migration of Virtual Machines," 2005, 14 pages.
Lowell, D. et al., "Devirtualizable Virtual Machines Enabling General, Single-Node, Online Maintenance," *ASPOLS*, Oct. 7-13, 2004, 1-13.
Sapuntzakis, C. et al., "Optimizing the Migration of Virtual Computers," 2002, 14 pages.

* cited by examiner

*Primary Examiner* — Gregory A Kessler
(74) *Attorney, Agent, or Firm* — Jim Sfekas; Kate Drakos; Micky Minhas

(57) ABSTRACT

Migration mechanisms are disclosed herein that smartly transfer data among virtual machines, minimizing the down time of migration of such machines but maximizing the consistent state of data stored thereon. Specifically, data can be classified into three types: low volatility data (such as hard disk data), high volatility data (such a random access memory data), and immutable data (such as read only data). This data can be migrated from a source virtual machine to a target virtual machine by sending the immutable data along with the low volatility data first—before the source virtual machine has stopped itself for the migration process. Then, after the source virtual machine has stopped, high volatility data and (again) low volatility data can be sent from the source to the target. In this latter case, only differences between the low volatility data may be sent (or alternatively, new low volatility data may be sent).

15 Claims, 9 Drawing Sheets

VIRTUAL MACHINE SMART MIGRATION

FIELD OF TECHNOLOGY

The presently disclosed subject matter relates to the field of computing, and more particularly, to computer virtualization, although virtualization is merely an exemplary and non-limiting field.

BACKGROUND OF THE INVENTION

Data can be migrated between computing devices in a variety of ways. In the context of virtual machines, it can be migrated in at least two ways: (1) using "cold" migration, where a source virtual machine is shut down, and data in the source is transferred to a target virtual machine; (2) alternatively, data can be transferred using "hot" (or "live") migration, where the source virtual machine is running as data is transferred to the target virtual machine. Each migration technique has its own set of advantages and disadvantages. For instance, "cold" migration may result in virtual machines being down or offline for too long as data is being transferred, while "hot" migration may result in the transferring of data that keeps changing on the source virtual machine relative to the target virtual machine, which requires special server-server bindings, configuration settings, and other special hardware. Thus, "warm" migration mechanisms are needed that smartly transfer data among virtual machines, minimizing the downtime of such machines but at the same time maximizing the consistent state of data stored thereon (while reducing the requirements and configuration for the servers involved in the process).

SUMMARY

Migration mechanisms are disclosed herein that smartly transfer virtual machines among virtual machine servers, minimizing the down time of such machines but maximizing the consistent state of data stored thereon. Specifically, data can be classified into three types: low volatility data (such as hard disk data), high volatility data (such a random access memory data), and immutable data (such as read only data). This data can be migrated from a source virtual machine to a target virtual machine by sending the immutable data along with the low volatility data first, and doing so before the source virtual machine has stopped itself for the migration process. Then, after the source virtual machine has stopped, high volatility data, and again, low volatility data can be sent from the source to the target. In this latter case, only differences (changes) between the low volatility data may be sent.

Other additional and non limiting aspects are disclosed herein, such as the sending of high volatility data before the source virtual machine is stopped, or the sending anew (instead of differences) of the low volatility data. It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included.

DETAILED DESCRIPTION

Overview

The present disclosure illustrates and explains various aspects of smart virtual machine migration. In the first section of the disclosure, different kinds of virtual machines are considered whose data can be migrated to other virtual machines (however, it should be noted that the migration mechanisms described herein could be applied to any computing devices, whether in hardware and/or software form). Then, in the second section, the migration mechanisms themselves are described in detail. Lastly, any additional subject matter complementing the various aspects described herein is hereby incorporated by reference in its entirety as U.S. application Ser. No. 11/544,485 ("BITS/RDC INTEGRATION AND BITS ENHANCEMENTS").

By way of example and not limitation, the second section describes how data can be classified into at least three different data types: immutable data, low volatility data, and high volatility data (although it is worth mentioning that this classification scheme represents only one exemplary aspect; if new data types come into existence, or some specific workload does not follow this classification pattern, the labels in the data itself can be changed without changing the system/approach employed herein). The first two of these data types can be migrated while a source virtual machine is still running (and an attempt to send the third data type, viz. high volatility data, can also be made at this point). Moreover, the second and third data type can be sent while the source virtual machine has stopped running (this can mean that the virtual machine is no longer running and it can imply a variety of states, including but not limiting to: paused, saved, or stopped.). By sending data that does not change (much) while a virtual machine is running, and sending data that is volatile while the virtual machine has stopped, results can be obtained where the downtime of the virtual machine is minimized, and the consistent state of data among the source and target virtual machine(s) can be maximized.

Types of Virtual Machines Used in Smart Migration

Figure 1:
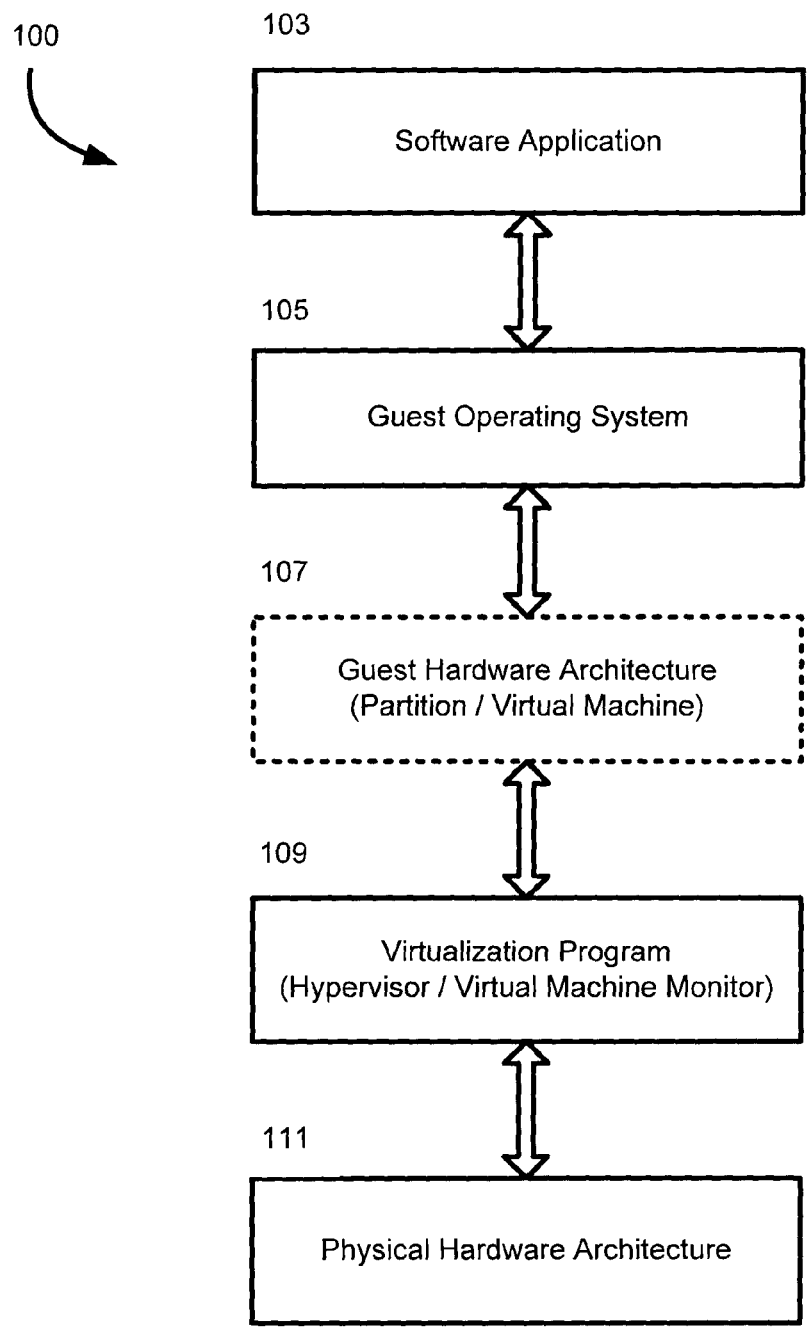
FIG. 1 is a block diagram representing the logical layering of the hardware and software architecture for virtualized operating environment in a computer system.

FIG. 1 is a diagram representing the logical layering of the hardware and software architecture for a virtualized environment in a computer system. Thus, it shows a general type of virtual machine. In FIG. 1, a virtualization program 109 runs directly or indirectly on the physical hardware architecture 111. The virtualization program 109 may be (a) a virtual machine monitor that runs alongside a host operating system, (b) a host operating system with a hypervisor component, where the hypervisor component performs the virtualization, (c) hardware, or (d) micro-code. The virtualization program 109 virtualizes a guest hardware architecture 107 (shown as dashed lines to illustrate the fact that this component is a "partition" or a "virtual machine"), that is, hardware that does not actually exist but is instead virtualized by the virtualization program 109. A guest operating system 106 executes on the guest hardware architecture 107, and a software application 103 can run on the guest operating system 105. In the virtualized operating environment of FIG. 1, the software application 103 can run in a computer system 101 even if the software application 103 is designed to run on an operating system that is generally incompatible with a host operating system and the hardware architecture 111.

Figure 2:
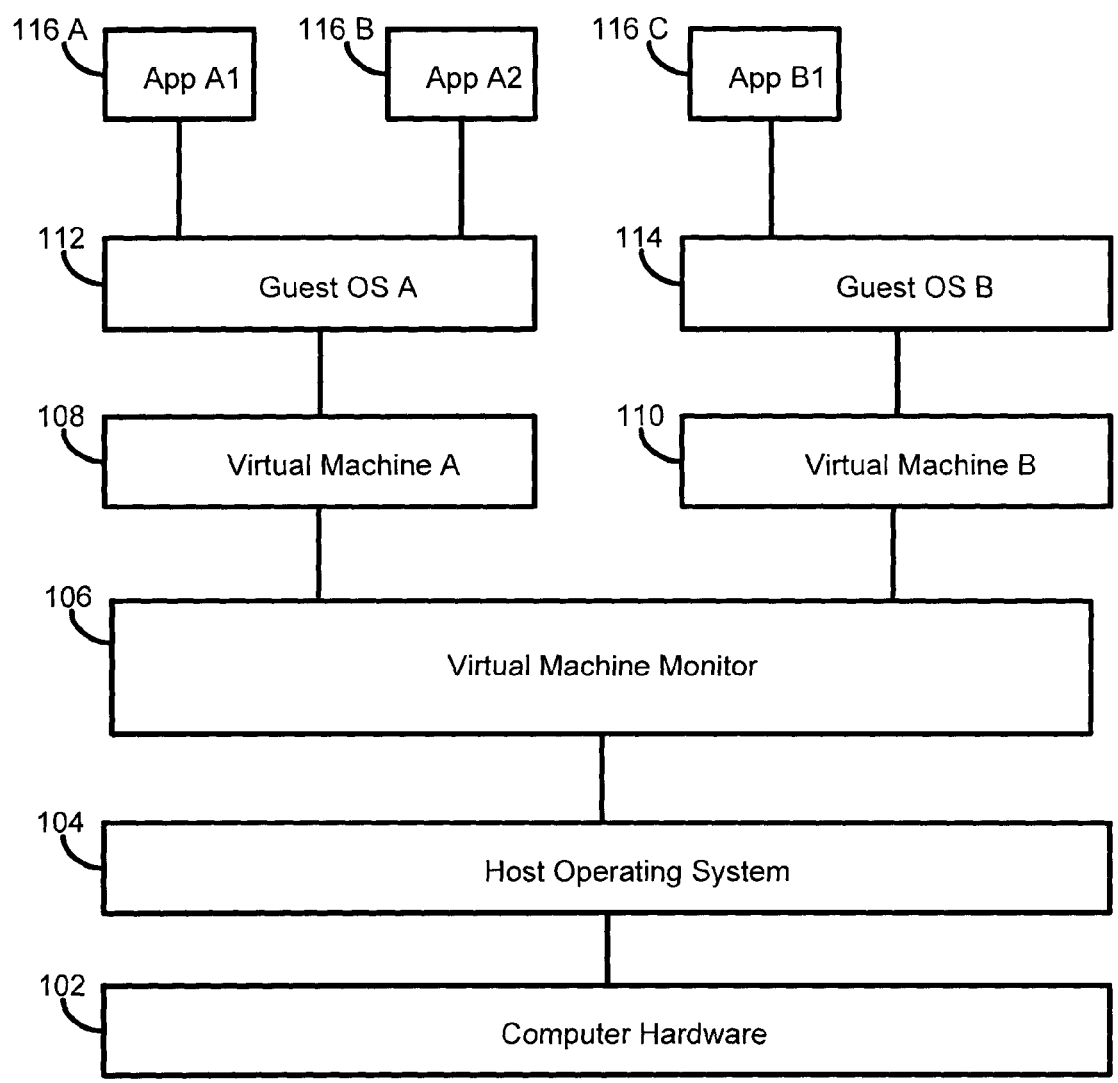
FIG. 2 is a block diagram representing a virtualized computing system, where virtualization is performed by the host operating system (either directly or via a hypervisor)
Figure 3:
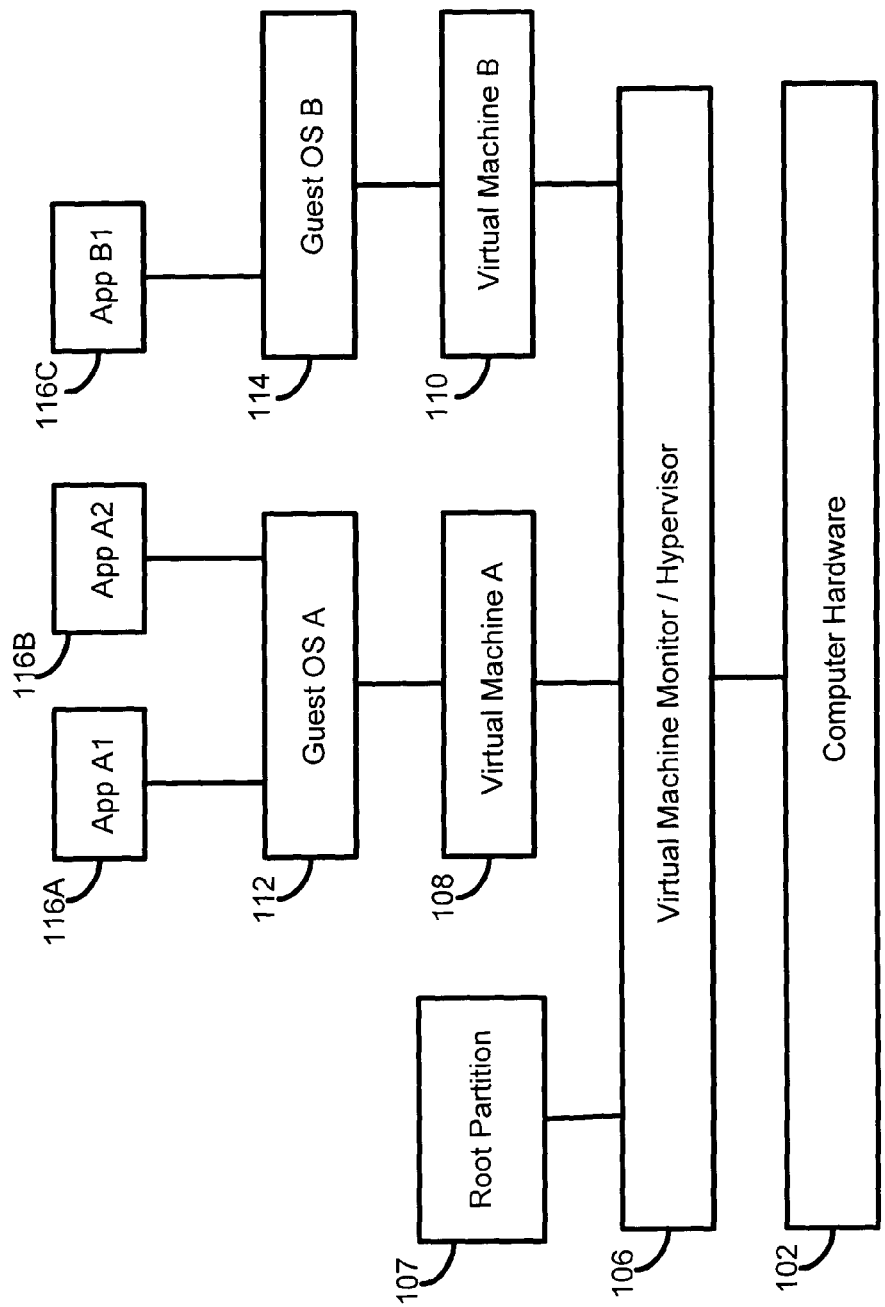
FIG. 3 is a block diagram representing an alternative virtualized computing system, where virtualization is performed by a virtual machine monitor (VMM) running alongside a host operating system.

FIGS. 2 and 3 depict example virtualized computing systems. Referring to FIG. 2, the flexibility of layered software allows virtual machines 108, 110 to present a virtual hardware layer that may be in fact another software layer. In this way, the virtual machines 108, 110 may create the illusion for the software layers above it that said software layers are running on their own isolated private computer system and physical hardware, and thus virtual machines may allow multiple guest systems 112, 114 and associated applications 116A, B, C to run concurrently on a single host system 104.

A virtualized computing system may comprise a host operating system software layer 104 running directly above physical computer hardware 102. A virtual machine monitor (VMM) 106 may virtualize all the resources of the machine by exposing interfaces that are the same as those of the hardware on which the host operating system 104 is running, enabling the host operating system 104 to go unnoticed by guest operating systems 112, 114 running in the virtual machines 108, 110.

Referring to FIG. 3, in another aspect of the present disclosure, a virtual machine monitor 106 (VMM) software layer acting as a hypervisor may be running directly on computer hardware 102. A root partition 107 running in a layer on top of the VMM 106 may provide host operating system services to the VMM 106. Virtual machine A 108 and virtual machine B 110 may be virtualized computer hardware representations. Virtual machine A 108 and virtual machine B 110 may present a virtualized environment to Guest OS A 112 and Guest OS B 114 respectively. The virtual machine monitor 106 may perform all of the software steps necessary for Guest OS A 112 and Guest OS B 114 to indirectly interact with the real physical computer hardware 102 while leveraging the host OS facilities from the root partition 107. Guest OS A 112 may provide an operating environment for applications 116A, B. Likewise, Guest OS B 114 may provide an operating environment for applications 116C.

In one aspect of the present disclosure, the virtual machine monitor 106 may comprise part of the host operating system 104. In other embodiments, the virtual machine monitor 106 may be an application running above the host operating system 104 and interacting with the computer hardware 102 through said host operating system 104, for example. In yet other aspects, the virtual machine monitor 106 may comprise a partially independent software system that may interact indirectly with the computer hardware 102 via the host operating system 104 but may also virtual machine monitor 106 interacts with the computer hardware 102. In another aspect, the virtual machine monitor 106 may comprise an independent software system that may interact with the computer hardware 102 without utilizing the host operating system 104.

The variations for implementing virtual machines and virtual machine monitors or hypervisors described above are just exemplary implementations, and nothing herein should be interpreted as limiting the disclosure to any particular virtualization aspect.

All of these variations for implementing the above mentioned partitions are just exemplary implementations, and nothing herein should be interpreted as limiting the disclosure to any particular virtualization aspect.

Virtual Machine Smart Migration

Figure 4:
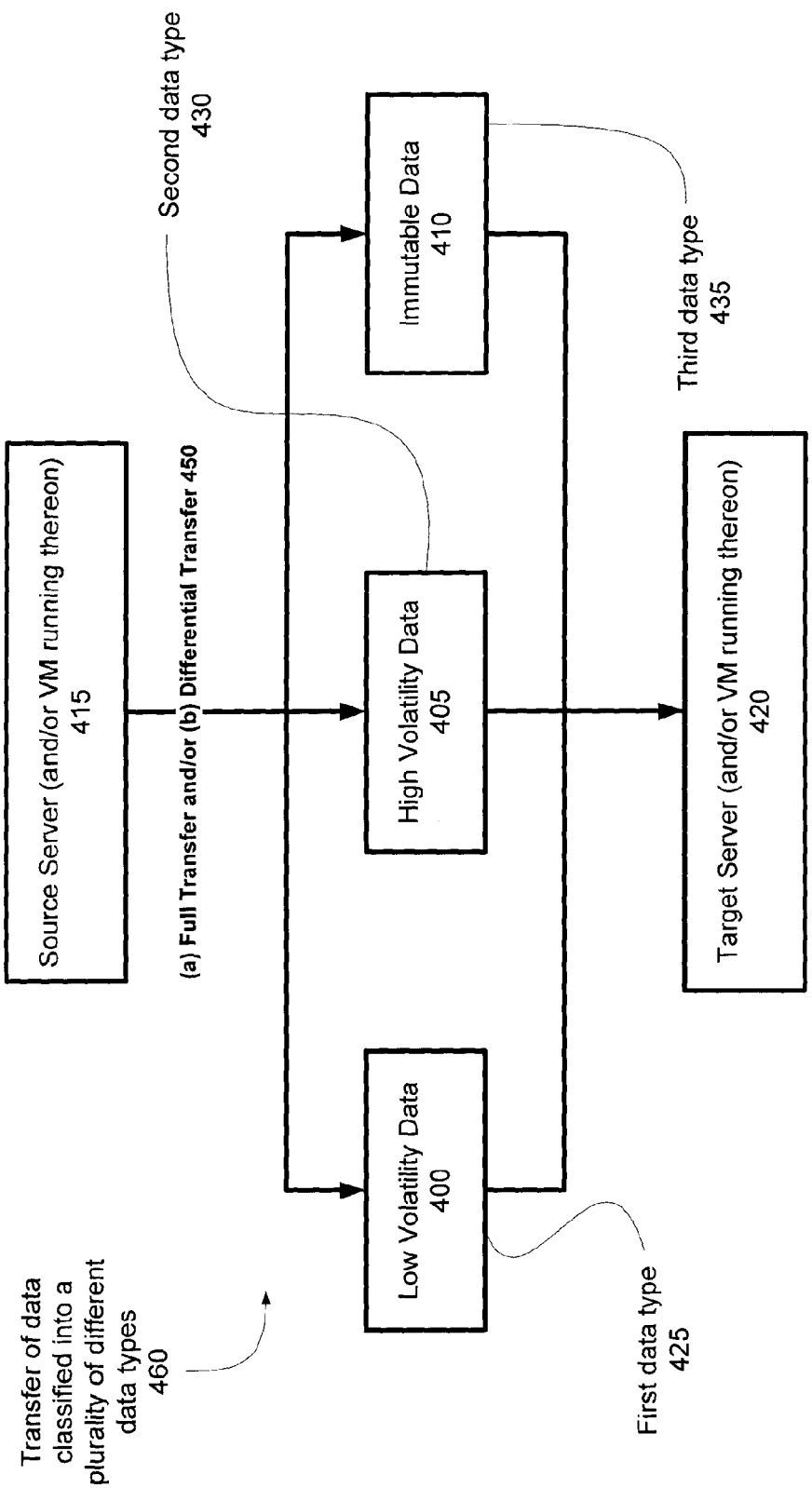
FIG. 4 illustrates the classification of data into different data types, a technique which aids in the data migration process.

FIG. 4 illustrates the classification of data into different data types. A first data type 425, a second data type 430, and a third data type 435 are shown. The first data type 425, which may comprise low volatility data, in other words, data that does not dramatically change during short periods of time. By way of example, a virtual machine (a.k.a. partition) hard disk data may be classified as low volatility data when it stored in the form of hard disk data blocks, undo disks, and so on.

In contrast, the second type of data 430, which may comprise high volatility data 405, is subject to change dramatically during short periods of time. One such example may involve a virtual machine's random access memory (RAM) memory blocks. The line between the low volatility data 400 and high volatility data 405 can be set according to predetermined standards, as those of skill in the art will readily appreciate. Once such standard may be based on how much data changes per unit of time; the details of such a standard, are, of course, implementation specific. RAM data is one clear example of high volatility data 405; hard disk data is one clear example of low volatility data 400. Other types of data may be classified as either one type of data or another (or both—at different times), depending on how often such data is accessed and changed. For instance, a jump drive may qualify as low volatility data 400 if it is used as an extended hard disk; however, if it is being constantly accessed and changed, it may qualify as high volatility data 405. Thus, in one aspect of the presently disclosed subject matter, the use of data may dictate its classification as to the type of data it is.

In contrast to these two types of data 425, 430 that change at some point, the third type of data 435 is classified as immutable data 410, since it does not change at all. For instance, this type of data 435 may be stored in read only memory (ROM), or it may be stored on digital versatile disks (DVDs). Alternatively, immutable data 410 can manifest itself in the form of ISO images (i.e. ISO files), parent virtual hard disks, checkpoints, backups, and so on.

In FIG. 4, a source server 415 migrates data 400, 405, 410 to a target server 420. The term "migration" herein is associated with the sending and/or receiving (i.e. transferring) of data among virtual machines (and includes the notion of moving an entire virtual machine from one server to another server). Moreover, data can be migrated from virtual machines residing on servers (or some equivalent computing devices) to other virtual machines located on some other servers (or some equivalent computing devices)—or even the same servers and/or computing devices. Although data migration herein is described in the context of virtual machines, it is not limited to virtual machines, since the presently disclosed migration techniques are universally applicable to all kinds of computing devices that have data.

Per FIG. 4, the migration of data 400, 405, 410 can be performed as a full data transfer and/or a differential data transfer 450, depending on the type of data that is involved. For instance, immutable data 410 can be fully migrated in one transaction from the source server 415 to the target server 420. Since it does not change, there is no need to transfer it again (or to transfer any differences between the two servers 415, 420, in order to put such data 410 in a consistent state). High volatility data 405 (or even low volatility data 400), on the other hand, may be differentially transferred between the two servers 415, 420, since it is in flux and needs to be updated. Alternatively, a combination of these transfer mechanisms can be used, where some type of data is first fully transferred and then differentially updated; or, first fully transferred and then again fully updated (i.e. essentially overwritten); or, first differentially transferred and then differentially updated. As to which transfer mechanism is used, as much will depend on the specific implementation.

In fact, in one aspect of the presently disclosed subject matter, a volume filter driver can be used, where this driver can perform basically the same function of differential transfer of data. Thus, instead of copying an entire file to a new server, the changed data blocks can be transferred that the driver has captured, without needing to turn off the virtual machine (for the driver to start capturing the changed blocks). This can minimize the amount of data transferred.

Figure 5:
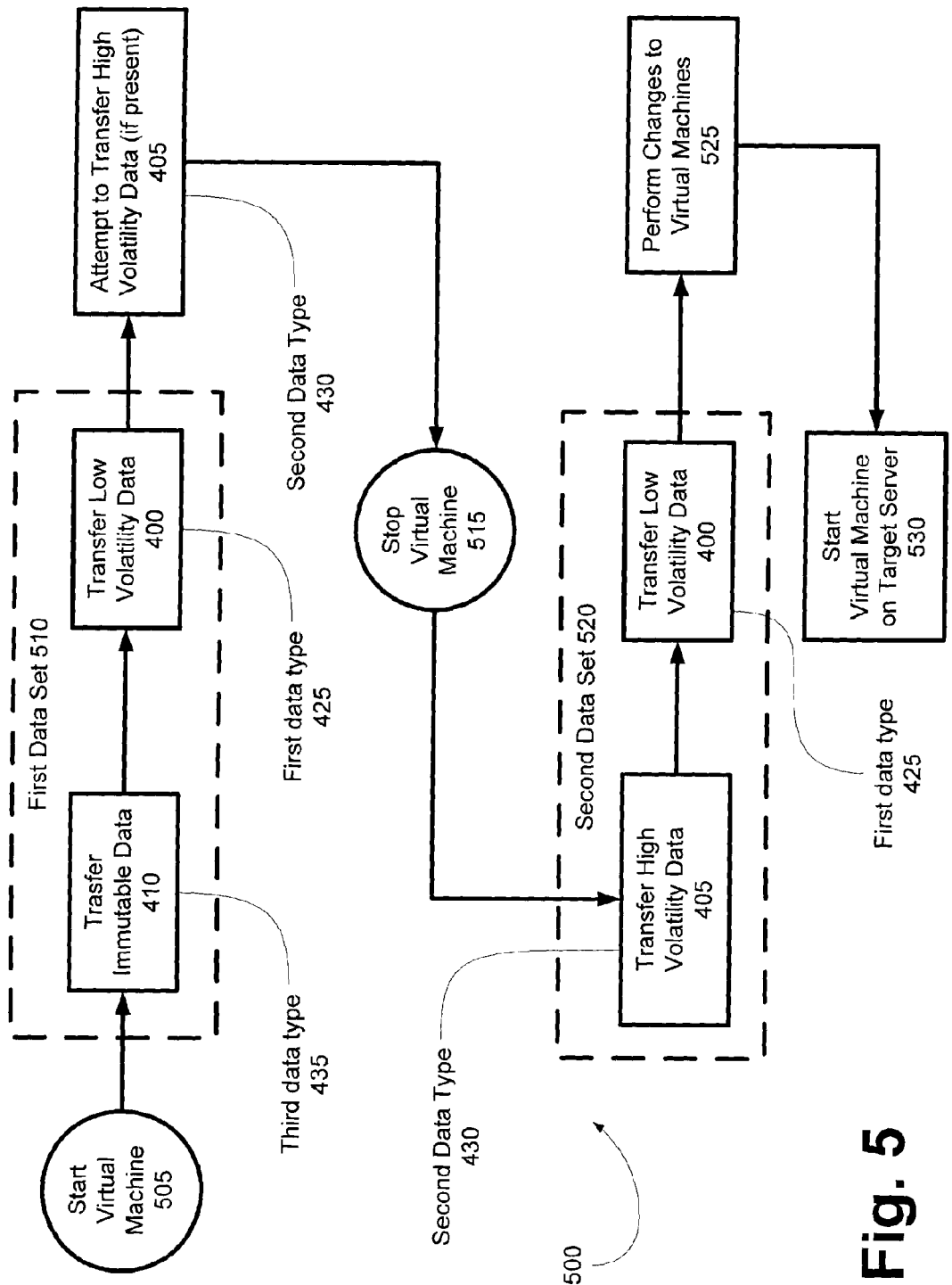
FIG. 5 illustrates a general mechanism for migrating data among virtual machines, where the different data types are sent at different stages of the virtual machines running and having stopped.

Turning now to FIG. 5, a system is shown that is set up to migrate a virtual machine. In this system, data is classified into a plurality of data types discussed already with reference to FIG. 4. A source virtual machine may be running 505, and it may contain three types of data 425, 430, 435. Two of these types of data, such as low volatility data 400 and immutable data 410, can be sent as subsets of a first data set 510 before the source virtual machine stops 515. Alternatively, any remaining types of data, such as high volatility data 405, can also be sent before the stop 515, if such data 405 happens to be present in the virtual machine.

Once the source virtual machine has stopped 515, a second data set 520 can be sent from the target virtual machine to the source virtual machine. This second set of data 520 can contain high volatility data 405 (that in part may have already been transferred before the virtual machine stopped 515, if such data was present) and low volatility data 400 (that also was transferred in the first data set 510). In this aspect of the presently disclosed subject matter, the immutable data 410 does not need to be sent after the stop 515, since it has not changed since the virtual machine started 505.

After the stop 515, the low volatility data 400 can be transferred either by performing a full transfer of data or a differential transfer of data. In the former case, low volatility data 400 that was transferred as part of the first data set 510 may be transferred anew as part of the second data set 520. The reason for this may be that it would take more processing power to calculate and transfer data differences (i.e. the delta between the low volatility data 400 of the first set 510 and the low volatility data 400 of the second set 520) than to resend the entire data. In another exemplary implementation, without loss of generality, low volatility data 400 can be skipped from the first data set 510 and transferred in full in the second data set 520, if transferring deltas or chunks is not an option for that implementation and network bandwidth is not a concern.

However, where this is not the case, as in the latter case, differential transfer of data can be used. This means that only blocks of low volatility data that have changed from the first set 510 to the second set 520 will be transferred from the source virtual machine to the target virtual machine. Such differential transfer of data, presupposes that data differences are being tracked as data keeps changing in the virtual machines—an aspect contemplated by the present disclosure.

Figure 6:
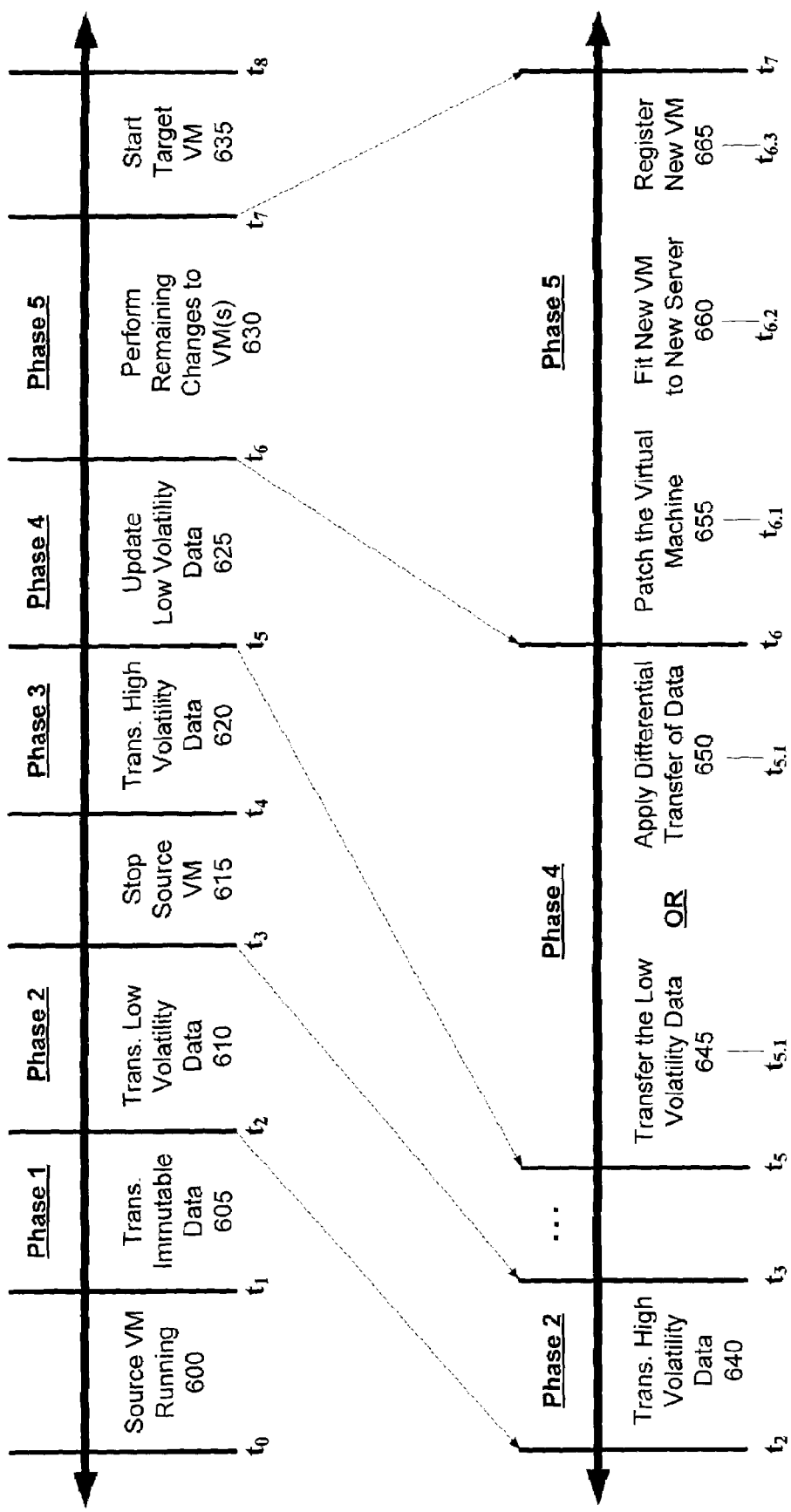
FIG. 6 provides a temporal view of one exemplary and non-limiting migration aspect, where data is migrated in different phases using various strategies in each phase.

After all the relevant data has been transferred to the target virtual machine, changes may be implemented in the target machine 525. FIG. 6 shows these changes, which include, but are not limited to: patching of the virtual machine physical locations to reflect new storage (namely, low volatility hard disk data, immutable ISO images, and so on) 655; performing the necessary changes to fit the new (target) virtual machine to the new (target) server, which may include the reduction of the number of processors or percentage of allocated processing/computing power, if the new server cannot handle the original transfer load 660; registering the new virtual machine with the new server 665, and so on. It should be noted that these changes would be implemented either before, during, or after the transfer of the data from the source virtual machine, as would be appropriate and as those of skill in the art will readily appreciate. Once these changes are implemented, the new virtual machine can resume running 530. Once it has started running, updates of the different types of data 400, 405, 410 can be supplied, using the transfer techniques discussed above.

Next, FIG. 6 provides a temporal view of one exemplary and non-limiting migration aspect, where data is migrated in different phases using various strategies in each phase. A time $t_0$, a source virtual machine (VM) may be running 600. As it is running, during a first phase (Phase 1), immutable data may be transferred 605 on or after some time $t_1$, where it is understood from the subscript notation that $t_0 < t_1$. Then, during phase 2, low volatility data can be transferred 610. During this same phase, or some phase directly before or after (shown in FIG. 6 as "Phase 2x"), high volatility data 640 can also be sent, if it is present and if it makes sense to send such rapidly changing data (which is a design implementation detail, subject to the data traffic, hardware capacity, the goals of the implementation, and so on).

At some point in time, say time $t_3$, the virtual machine will stop 615. The time of stoppage and the duration thereof will depend on various heuristics, such as data traffic, the anticipated data transfer time (which may be a function of the size of data), and so on. Once the virtual machine has stopped, the more volatile data can be transferred (i.e. volatility vis-à-vis the immutable data). Thus, at time $t_4$, high volatility data can be sent to the target virtual machine (phase 3), followed by, at time $t_5$, low volatility data 625 (phase 4). Thus, data can transferred in at least four phases.

However, as is shown in FIG. 6, these phases may contain sub-phases or alternative considerations. As mentioned above, in phase 2x, an attempt to transfer high volatility data can be made. Moreover, during phase 4 transfer of low volatility data can either be full 645 or differential 650, depending on the need. Thus, these four transfer phases 605, 610, 620, 625 are not limited to what is shown in FIG. 6, but rather to what is disclosed in this entire document. Similarly, the temporal order of transfer herein is also merely exemplary and not limiting, as evidenced by FIGS. 4 and 5 that are not tied down to any specific temporal restrictions. Lastly, as discussed above, during an initiation or instantiation phase 630, the target virtual machine can be patched up 655, set up 660, and registered 665. After this, at time $t_7$, the target virtual machine can start up 635 (although, it should be noted that in some implementations some of the aforementioned steps 655, 660, 665 can be performed once the virtual machine has already started).

Figure 7:
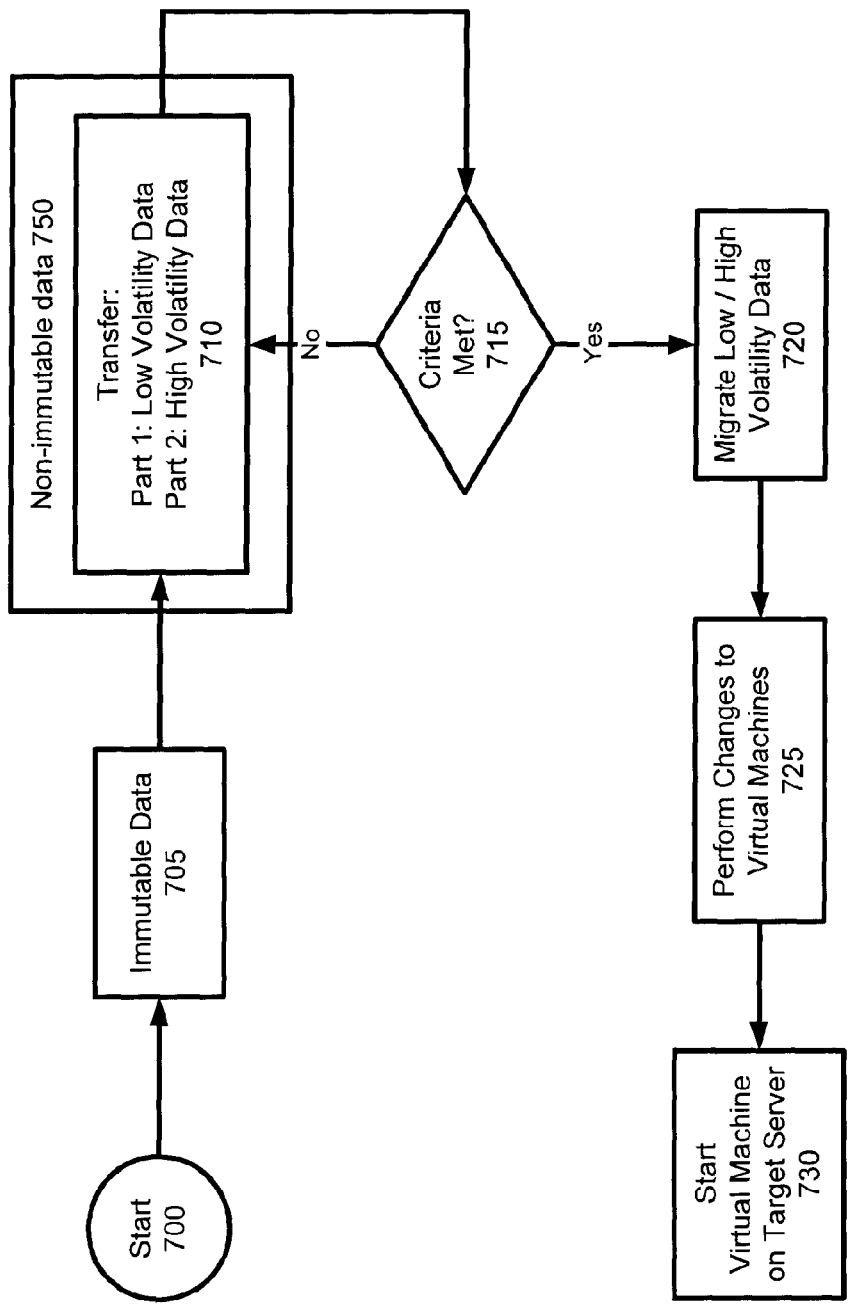
FIG. 7 shows that data may be migrated using various criteria, especially when high and low volatility data is being transferred.

FIG. 7 shows that data may be migrated using various criteria, especially when high and low volatility data is being transferred. For example, if the present aspect of the disclosed subject matter herein were in the form of computer readable medium storing thereon computer executable instructions, it could include instructions configured to migrate an immutable data 705 a target device, instructions configured to migrate a first part 710 of a non-immutable data 750 to the target device, and instructions configured to migrate a second part 710 of the non-immutable data 750 to the target device. The non-immutable data 750 could include the low volatility 400 and high volatility 405 data discussed with reference to FIG. 4. Moreover, it is understood that these instructions could be practiced as methods or implemented as system or apparatuses.

In any event, even given these migration instructions that may be set up to perform the actual transfer of data, further instructions can be used to decide where and when to migrate such data, per some specified criteria 715. For instance, with respect to the immutable data 750, one criterion 715 for transferring data could be based on information regarding the data size of the non-immutable data 750 (in whole or in part 710). Another criterion could be based on information regarding the down time of a source device from which data is being transferred. In fact, a full set of criteria could be compiled to ensure that data is being migrated in the most efficient and productive manner. Furthermore, users can also setup policies that could guide the criteria and how data will be transferred. Thus, in addition to the smart choices the system can make, the user can guide some of the decisions too in terms of how to deal with low and high volatility and other type of data As FIG. 7 illustrates, if the relevant criteria 715 are met, the low and high volatility data can be migrated 720. Other types of data may also be subject to their own criteria. Immutable data 705, for example, may be sent according to its own data size. Thus, data can be migrated, of whichever type, at once or periodically (employing, for example, multi-server caching in such a scenario). Once the data is migrated 720, the relevant changes to the target virtual machine can be performed 725 (and to the source virtual machine too, for that matter). The virtual machine with the migrated data can then start running 730 and keep receiving updates from the source and various other sources.

In another aspect of the presently disclosed subject matter, the migration can be executed at a time when the machine down time will meet a predetermined specification and/or policy (e.g. a predetermined virtual machine time constraint). For example, a 'pre-copy' can be performed and preparations for a 'final' or 'differential' copy can be made. If there happens to be a discovery (e.g. by measuring the change) that the time to do the 'final' copy will not meet the specification, then a differential copy can be completed, but it may be treated it as an 'incremental' rather than 'final' copy (e.g. the virtual machine can be left running and the target can be updated). Then, preparations can be made to do a 'final' copy (e.g. a final copy of the aforementioned high volatility data when the machine has stopped running). It should be noted that these steps can be repeated until a 'final' copy is established that meets the machine down-time policy/specification (e.g. less than 30 seconds).

In another aspect of the presently disclosed subject matter, the virtual machine can be only migrated if the migration can be done with down time less than a constraint. The down time can be a function of the size of the differential data and/or the rate at which the differential data can be transmitted and applied. The quantity of differential data can vary over time so migration could occur at a time when the differential data is small enough to meet the down time constraint.

For example, the down time policy could also contain a maximum time to wait. For instance, a policy could be stipulated in code that would execute a policy, such as: 'Begin trying to move the machine at 5 p.m. with less than 30 seconds of down time, but make sure that it happens no later than 3 a.m. even if the down-time must be violated.' Or, another policy could state: 'Begin trying to move the machine at 6 p.m. with less than 10 seconds of downtime; after 5 a.m. give up.' And so on.

Figure 8:
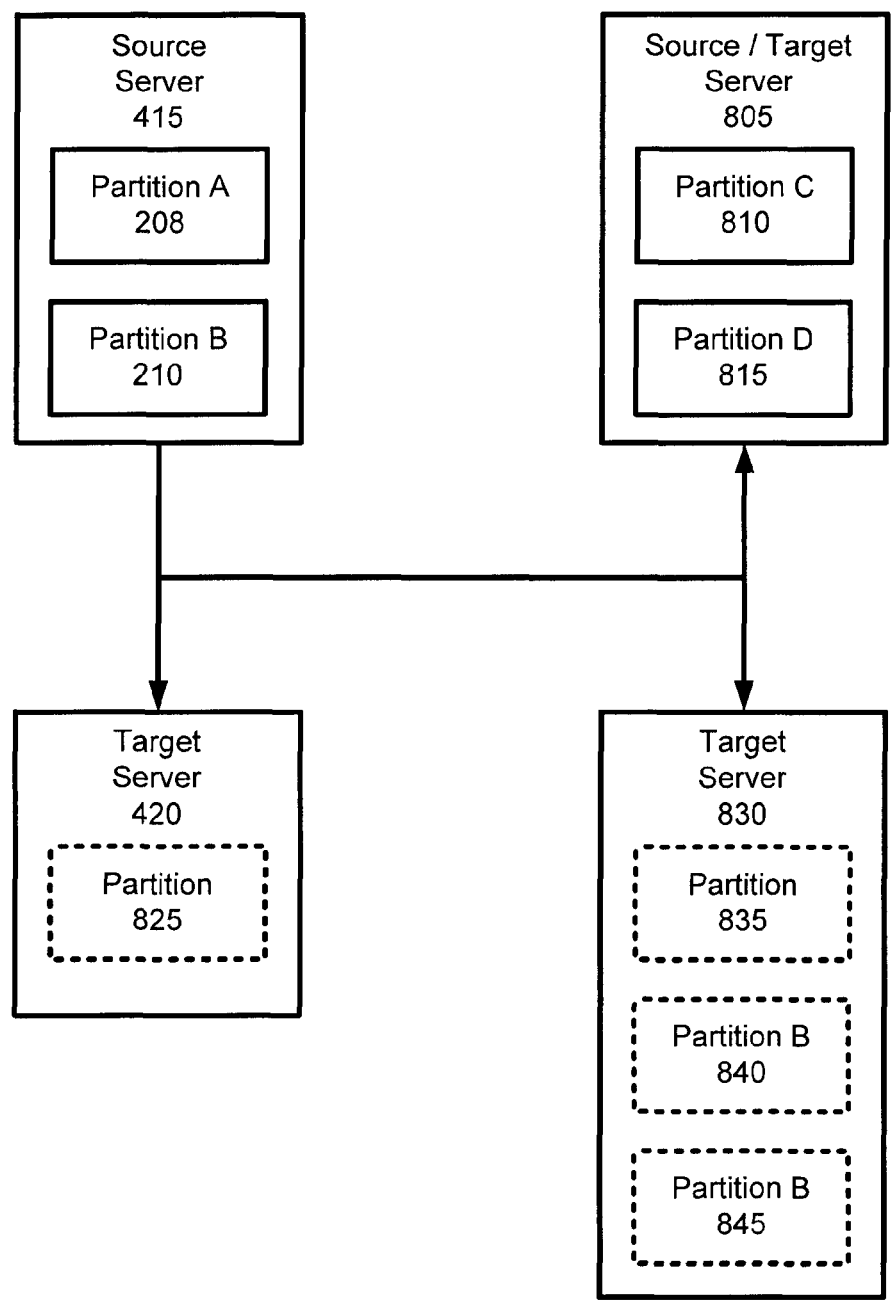
FIG. 8 illustrates the notion that data migration can occur in various combinations among source and target virtual machines.

Further to this point, FIG. 8 illustrates the notion that data migration can occur in various combinations among source and target virtual machines (a.k.a. partitions). Specifically, a source server 800 can have a plurality of residing partitions 208, 210, such as the ones shown with reference to FIGS. 2A and 2B. These partitions 208, 210 can be the source of data for various target partitions 810, 815, 825, 835, 840, 845. In fact, any partition can act as a source and as a target partition, depending on whether it is sending or receiving data.

Partitions C 810 and D 815 can both (or individually) be sources and/or targets, depending receipt and sending of data. The four servers shown 415, 420, 805, 830 can have a plurality of such partitions that may all send and receive data with each other (and other partitions, not shown). Moreover, the source server 415 and target server 420 of FIG. 4, in this context, could function such that data from partition A 208 and partition B 210 ends up being migrated to the partition 825 on the target server (a many-to-one migration scenario; the opposite, one-to-many migration is contemplated herein also, as is the nominal one-to-one migration scenario, discussed above in extensive detail).

In another aspect of the presently disclosed subject matter, a virtual machine can be pre-copied to multiple candidate servers and stay there for a possible migration. For example, mission critical virtual machines can have the immutable and low volatility data replicated in multiple servers most (or all) the time. When the administrator needs to move it, and he chooses one of the pre-caching servers, most of the data is already there. This will reduce dramatically the time needed to perform the migration from the moment the administrator decides to perform the operation to its completion (it should be noted that this also implies that an administrator might choose not to move data to one of the pre-caching servers). In view of this, a virtual machine may be cloned with minimal downtime. Instead of transferring data, the entire data can be copied and duplicated.

Figure 9:
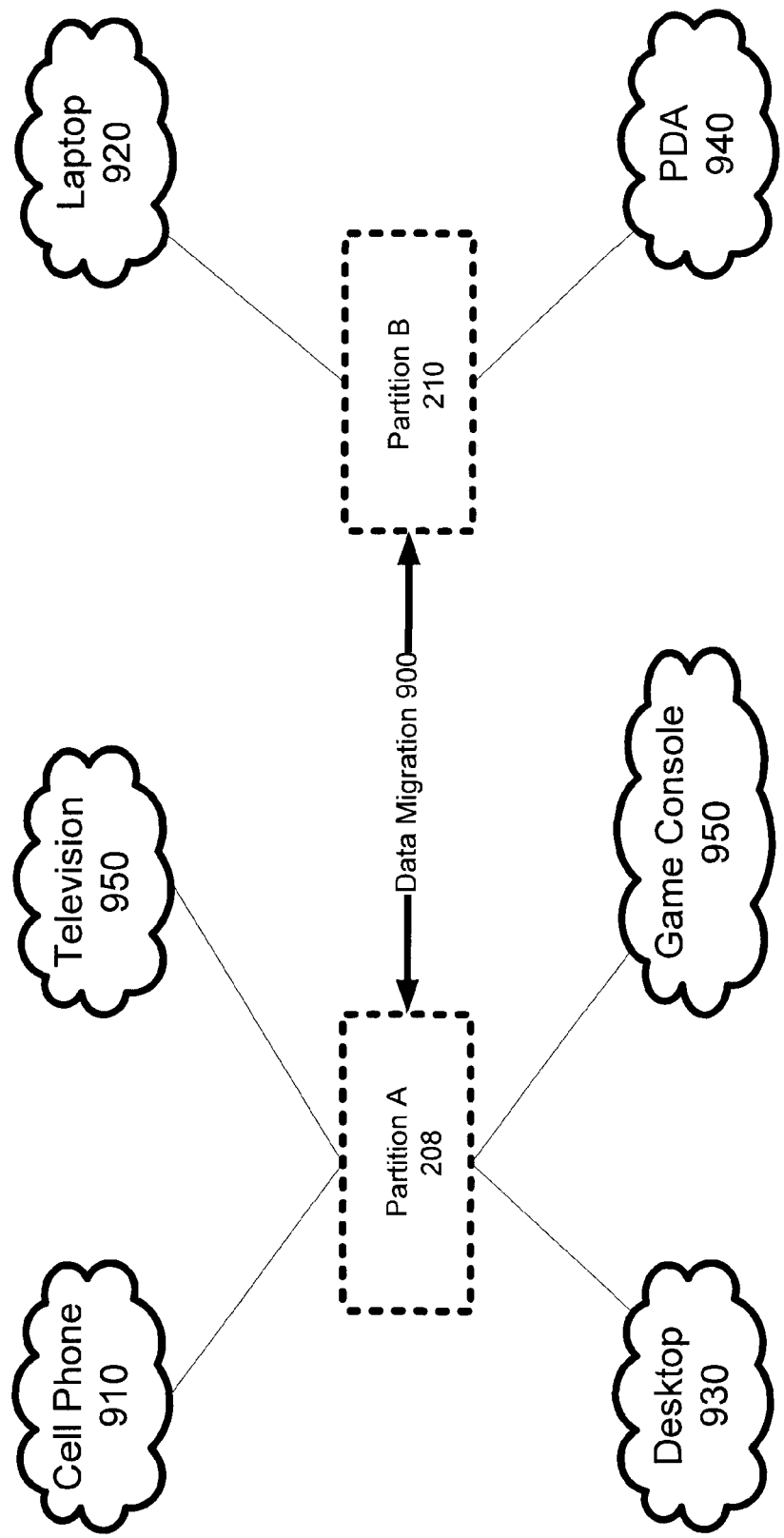
FIG. 9 illustrates that virtual machines can be embodied in various physical media, depending on the use of such virtual machines.

Not only can data migration occur in various combinations among source and target virtual machines, but as FIG. 9 illustrates, virtual machines or partitions can be embodied in various physical media, depending on the use of such computing devices. For example, the partitions shown in FIGS. 2A and 2B, namely, partition A 208 and partition B 210, could be representative of partitions that exchange data (whether they are located on the same physical computing device or not). Partition A 208 could reside on a cell phone 910, a television 950, a desktop 930, a game console 950, and so on. Partition B 210 could reside on a laptop 920 or a personal digital assistant (PDA) 940, and so on. In short, both partitions can reside on any computing device, as such devices are understood to be general machine with memories and processors for manipulating data in such memories (wherein the term "data" herein is a general notion that encompasses the notion of "code" and "data" as understood by those of skill in the art). FIG. 9 shows that such data can be migrated between the partitions 208, 210, regardless of whether they are embodied as cell phones 910 or PDAs 940.

As was shown with respect to the discussion of FIG. 7, the methods, systems, and apparatuses of the presently disclosed subject matter may also be embodied in the form of program code (such as computer readable instructions) that is transmitted over some transmission medium, such as over electrical wiring or cabling, through fiber optics, or via any other form of transmission, wherein, when the program code is received (and/or stored on computer readable media) and loaded into and executed by a machine, such as an EPROM, a gate array, a programmable logic device (PLD), a client computer, such as that shown in the figure below, a video recorder or the like, the machine becomes an apparatus for practicing the present subject matter. When implemented on a general-purpose processor, the program code combines with the processor to provide a unique apparatus that operates to perform the saving and restoring functionality of the present subject matter.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, various mechanisms were disclosed for migrating data among virtual machines. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A computer system configured to transfer a virtual machine, comprising:
   a processor; and
   a memory coupled to the processor, the memory including instructions stored thereon that upon execution by the processor cause the computer system to at least:
   run a virtual machine, the virtual machine having access to random access memory and a virtual disk;
   send, while the virtual machine is running, data indicative of contents stored in the virtual disk and/or contents of the random access memory to a target computer system;
   determine that a first change to the data has occurred;
   send the target computer system a part of the data corresponding to the first change while the virtual machine is running, in response to determining that an amount of time needed to send the part of the data corresponding to the first change is greater than a threshold amount of time;
   determine that a second change to the data has occurred;
   determine that an amount of time needed to send a part of the data corresponding to the second change is less than the threshold amount of time;
   stop the virtual machine in response to the determination that the amount of time needed to send a part of the data corresponding to the second change is less than the threshold amount of time; and
   send, while the virtual machine is stopped, the part of the data corresponding to the second change to the target computer system.

2. The system according to claim 1, wherein the memory further comprises instructions that upon execution cause the computer system to:
   send, while the virtual machine is running, read-only data to the target computer system.

3. The system according to claim 1, wherein said instructions that upon execution cause the computer system to determine that the amount of time needed to send a part of the data corresponding to the second change that changed is less than the threshold amount of time further comprise instructions that upon execution cause the computer system to:
   determine that the amount of time is less than the threshold amount of time using information that identifies a data transfer rate.

4. The system according to claim 1, wherein the memory further comprises instructions that upon execution cause the computer system to:
   set the threshold amount of time based on a determined time of day.

5. The system according to claim 2, wherein said instructions that upon execution cause the computer system to send, while the virtual machine is running, read-only data to the target computer system further comprise instructions that upon execution cause the computer system to:
   send, while the virtual machine is running, data indicative of a parent virtual hard disk file to the target computer system.

6. The system according to claim 1, wherein said instructions that upon execution cause the computer system to determine that the amount of time needed to send the data corresponding to the second change is less than the threshold amount of time further comprise instructions that upon execution cause the computer system to:
   determine that the amount of time is less than the threshold amount of time based on an amount of down time that the virtual machine would have as a result of stopping the virtual machine to send the part of the data corresponding to the second change to the target computer system.

7. A computer-implemented method for transferring virtual machines, comprising:
   running, by a computer system, a virtual machine;
   sending to a target computer system, while the virtual machine is running, data stored in a virtual disk and/or stored in random access memory allocated;
   determining that a first change to the data has occurred;
   sending the target computer system a part of the data corresponding to the first change while the virtual machine is running, in response to determining that an estimated amount of time needed to send the part of the data corresponding to the first change is greater than a threshold amount of time;
   determining that a second change to the data has occurred;
   determining that an estimated amount of time needed to transfer a portion of the data corresponding to the second change is less than the threshold amount of time;
   stopping the virtual machine in response to the determination that the estimated amount of time is less than the threshold amount of time; and
   sending the portion of the data corresponding to the second change to the target computer system.

8. The method according to claim 7, further comprising:
   sending, while the virtual machine is running, read-only data associated with the virtual machine to the target computer system.

9. The method according to claim 7, further comprising:
   pre-caching said first data in a plurality of servers, the plurality of servers including the target computer system.

10. The method according to claim 8, wherein sending the read-only data associated with the virtual machine further comprises:

sending, while the virtual machine is running, data indicative of a parent virtual disk file to the target computer system.

11. The method according to claim 7, wherein determining that the estimated amount of time needed to transfer the portion of the data corresponding to the second change is less than the threshold amount of time further comprises:
 determining that the estimated amount of time is less than the threshold amount of time using information that identifies a data transfer rate.

12. The method according to claim 7, further comprising:
 setting the threshold amount of time based on a determined time of day.

13. A computer-readable storage medium including instructions stored thereon that upon execution by a processor of a computer system cause the computer system to at least:
 run a virtual machine, the virtual machine having access to random access memory and a virtual disk;
 send, while the virtual machine is running, data stored in a virtual disk file and/or stored in the random access memory to a second computer system;
 determine that a first change to the data has occurred;
 send the target computer system a part of the data corresponding to the first change while the virtual machine is running, in response to determining that an estimated amount of time needed to send the part of the data corresponding to the first change is greater than a threshold time, the threshold time being based on a detected time of day;
 determine that a second change to the data has occurred;
 determine a second threshold time based on a second detected time of day;
 determine that an estimated amount of time needed to send a part of the data corresponding to the second change is less than the determined second threshold amount of time;
 stop the virtual machine in response to the determination that the estimated amount of time needed to send the part of the data corresponding to the second change is less than the determined second threshold amount of time; and
 send the part of the data corresponding to the second change to the second computer system.

14. The computer-readable medium according to claim 13, further comprising instructions that upon execution cause the computer system to:
 send, while the virtual machine is running, data indicative of a read-only parent virtual hard disk file to the second computer system.

15. The computer-readable medium according to claim 13, further comprising instructions that upon execution cause the computer system to:
 determine that the estimated amount of time is less than the threshold using information that identifies a data transfer rate.

* * * * *